US012002635B2

(12) United States Patent
Lin et al.

(10) Patent No.: US 12,002,635 B2
(45) Date of Patent: Jun. 4, 2024

(54) KEYSWITCH STRUCTURE

(71) Applicant: DARFON ELECTRONICS CORP., Taoyuan (TW)

(72) Inventors: Chin-Hung Lin, Taoyuan (TW); Li-Yen Ning, Taoyuan (TW); Hsiao-Han Chu, Taoyuan (TW)

(73) Assignee: DARFON ELECTRONICS CORP., Taoyuan (TW)

( * ) Notice: Subject to any disclaimer, the term of this patent is extended or adjusted under 35 U.S.C. 154(b) by 0 days.

(21) Appl. No.: 17/979,790

(22) Filed: Nov. 3, 2022

(65) Prior Publication Data

US 2023/0238196 A1 Jul. 27, 2023

Related U.S. Application Data

(60) Provisional application No. 63/303,515, filed on Jan. 27, 2022.

(30) Foreign Application Priority Data

Aug. 29, 2022 (TW) ................................ 111132492

(51) Int. Cl.
*H01H 13/14* (2006.01)
*H01H 13/10* (2006.01)

(52) U.S. Cl.
CPC ............ *H01H 13/14* (2013.01); *H01H 13/10* (2013.01)

(58) Field of Classification Search
CPC ........ H01H 13/14; H01H 13/10; H01H 3/122; H01H 3/125; H01H 13/705;
(Continued)

(56) References Cited

U.S. PATENT DOCUMENTS

| | | | |
|---|---|---|---|
| 3,720,801 | A | 3/1973 | Yanaga |
| 6,100,482 | A | 8/2000 | Koma |

(Continued)

FOREIGN PATENT DOCUMENTS

| | | | |
|---|---|---|---|
| CN | 201673833 | U | 12/2010 |
| CN | 102364653 | A | 2/2012 |

(Continued)

OTHER PUBLICATIONS

Ning, the specification, including the claims, and drawings in the U.S. Appl. No. 17/884,588, filed Aug. 10, 2022.

*Primary Examiner* — Lheiren Mae A Caroc
(74) *Attorney, Agent, or Firm* — Winston Hsu

(57) ABSTRACT

A keyswitch structure includes a base plate, a keycap, and a support mechanism. The support mechanism supports the keycap above the base plate. An outer support of the support mechanism includes a reinforcing body and a connecting structure fixed on the reinforcing body. The outer support is connected to the base plate and the keycap through the connecting structure. In an embodiment, the reinforcing body has two openings. Two inner supports of the support mechanism are pivotally connected to the connecting structure and are located in the two openings, respectively. In another embodiment, the reinforcing body as a whole extends along a plane. The reinforcing body has a bent fringe, which is inserted into the connecting structure and is not perpendicular to the plane.

20 Claims, 8 Drawing Sheets

(58) Field of Classification Search
CPC .... H01H 13/7065; H01H 13/04; H01H 13/20; H01H 3/12; H01H 13/70
See application file for complete search history.

(56) References Cited

U.S. PATENT DOCUMENTS

| | | | | |
|---|---|---|---|---|
| 6,713,700 | B2 | 3/2004 | Hsu | |
| 8,080,744 | B2 | 12/2011 | Yeh | |
| 9,455,096 | B2 | 9/2016 | Chen | |
| 9,455,097 | B2 | 9/2016 | Chen | |
| 10,153,100 | B2 | 12/2018 | Yen | |
| 10,325,735 | B2 | 6/2019 | Yen | |
| 10,796,861 | B2 | 10/2020 | Chen | |
| 11,676,780 | B1 * | 6/2023 | Ku | H01H 3/125 200/5 A |
| 11,869,730 | B2 * | 1/2024 | Ning | H01H 3/125 |
| 2012/0298495 | A1 | 11/2012 | Zhang | |
| 2018/0025857 | A1 | 1/2018 | Yen | |
| 2019/0096602 | A1 | 3/2019 | Yen | |
| 2022/0189715 | A1 | 6/2022 | Hsu | |
| 2023/0084860 | A1 * | 3/2023 | Ning | H01H 13/14 200/341 |

FOREIGN PATENT DOCUMENTS

| | | | |
|---|---|---|---|
| CN | 202523584 | U | 11/2012 |
| CN | 102364653 | | 1/2014 |
| CN | 107658155 | A | 2/2018 |
| CN | 213184071 | U | 5/2021 |
| CN | 215008015 | | 12/2021 |
| TW | 541552 | | 7/2003 |
| TW | M354797 | | 4/2009 |
| TW | M386584 | U | 8/2010 |
| TW | M434981 | | 8/2012 |
| TW | M542226 | | 5/2017 |
| TW | 1600041 | B | 9/2017 |
| TW | 1680480 | B | 12/2019 |
| TW | I744151 | B | 10/2021 |

* cited by examiner

KEYSWITCH STRUCTURE

CROSS REFERENCE TO RELATED APPLICATIONS

This application claims the benefit of U.S. Provisional Application No. 63/303,515, filed on Jan. 27, 2022. The content of the application is incorporated herein by reference.

BACKGROUND OF THE INVENTION

1. Field of the Invention

The present invention relates to a keyswitch structure, and more particularly to a keyswitch structure.

2. Description of the Prior Art

The architecture of the current mechanical keyswitch is mainly to connect the keycap and the base with a lift mechanism, so that the keycap can move up and down relative to the base. The stability of the keycap movement, including the stroke and smoothness of the movement, usually relies on the lift mechanism. When the action stability of the lift mechanism is not good, it is difficult for the keycap to move smoothly. For multi-size keys, such as space bar, Enter, Shift, CapsLock, Ctrl keys, etc., the keycap is generally jointly supported by several lift mechanisms. In this structural configuration, each lift mechanism acts independently. When the keycap is pressed, the keycap is not easy to move up and down horizontally, and the keycap is easy to be skewed, resulting in poor triggering of the switch of the key. For this case, it is practicable to add a balance bar, which is connected to the keycap and the base plate independently of the lift mechanisms, so as to improve the levelness of the keycap when it moves up and down. However, the installation of the balance bar reduces the installation space of the lift mechanisms, so it may affect the structural rigidity and the action stability of the lift mechanism to a certain extent. Furthermore, the lifting mechanism is generally made of plastic. When the key is made with a low-profile design, the structure of each component will be thin, resulting in insufficient rigidity of the component itself, and the above problems will get worse.

SUMMARY OF THE INVENTION

An objective of the invention is to provide a keyswitch structure. An outer support of a support mechanism of the keyswitch structure is structurally reinforced, so that the structural rigidity and action stability of the support mechanism is improved.

A keyswitch structure of an embodiment according to the invention includes a base plate, a keycap, and a support mechanism. The support mechanism supports the keycap above the base plate in a vertical direction. The support mechanism includes a first inner support, a second inner support, and an outer support. The first inner support is connected the base plate and the keycap. The second inner support is connected to the base plate and the keycap. The outer support includes a reinforcing body and a connecting structure fixed on the reinforcing body. The elastic modulus of the reinforcing body is greater than the elastic modulus of the connecting structure. The reinforcing body has a first opening and a second opening. The first opening and the second opening are arranged along a rotation axis. The outer support is pivotally connected to the base plate, the keycap, the first inner support, and the second inner support with respect to the rotation axis through the connecting structure. The first inner support and the second inner support are located in the first opening and the second opening, respectively. Thereby, although the support mechanism is provided with the two inner supports so that the support mechanism as a whole extends longitudinally along the rotation axis, the reinforcing body can still enhance the structural strength, thereby improving the structural rigidity and action stability of the support mechanism so that the keycap can still move up and down steadily relative to the base plate, which helps the multi size keyswitch structure to be suitable for low-profile designs.

A keyswitch structure of another embodiment according to the invention includes a base plate, a keycap, and a support mechanism. The support mechanism supports the keycap above the base plate in a vertical direction. The support mechanism includes an inner support and an outer support. The inner support is connected to the base plate and the keycap. The outer support includes a reinforcing body and a connecting structure fixed on the reinforcing body. The elastic modulus of the reinforcing body is greater than the elastic modulus of the connecting structure. The reinforcing body has an opening. The outer support is pivotally connected to the base plate, the keycap, and the inner support with respect to the rotation axis through the connecting structure. The inner support is located in the opening. The reinforcing body as a whole extends along a plane. The reinforcing body has a bent fringe. The bent fringe is inserted into the connecting structure and is not perpendicular to the plane. Thereby, that the bent fringe is inserted into the connecting structure is conducive to the stable combination between the reinforcing body and the connecting structure and also helps to maintain the structural strength of the outer support, thereby improving the structural rigidity and action stability of the support mechanism so that the keycap can still move up and down steadily relative to the base plate, which helps the keyswitch structure to be suitable for low-profile designs.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
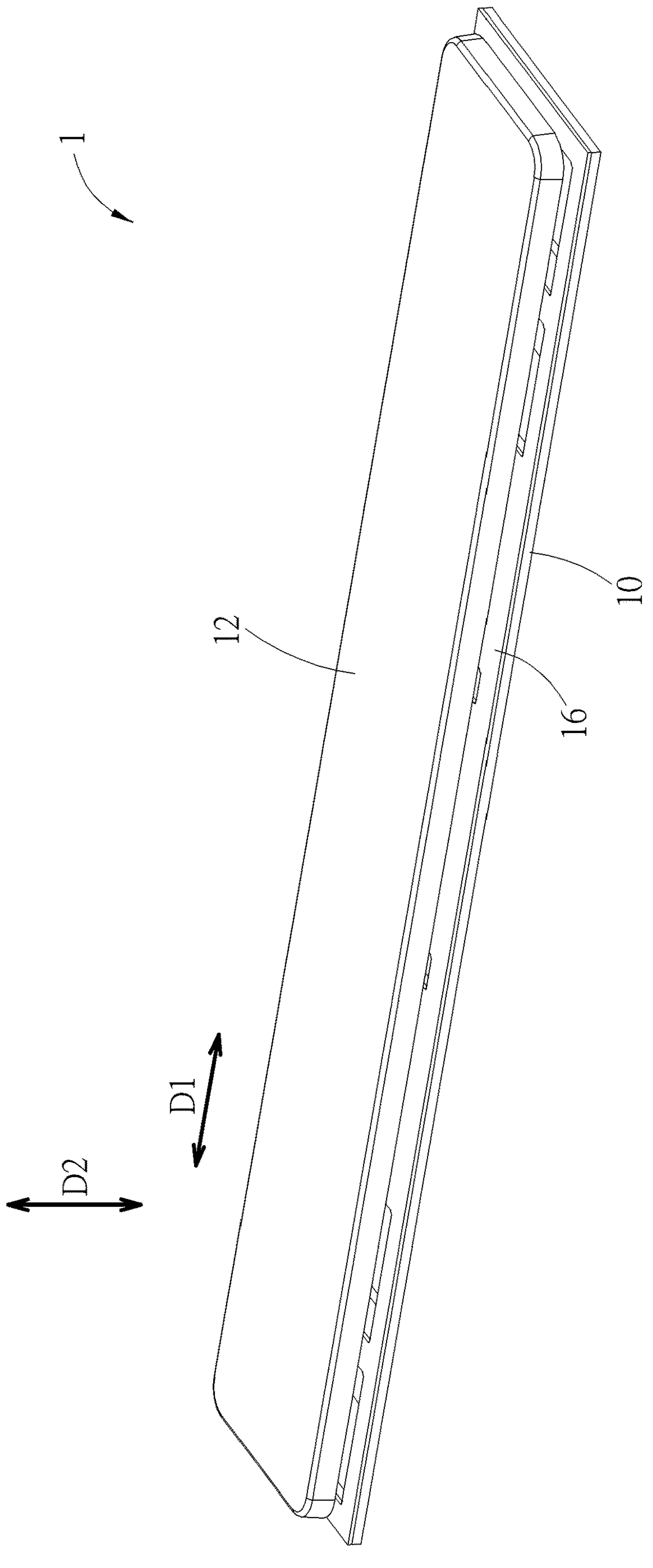
FIG. 1 is a schematic diagram illustrating a keyswitch structure according to a first embodiment.
Figure 2:
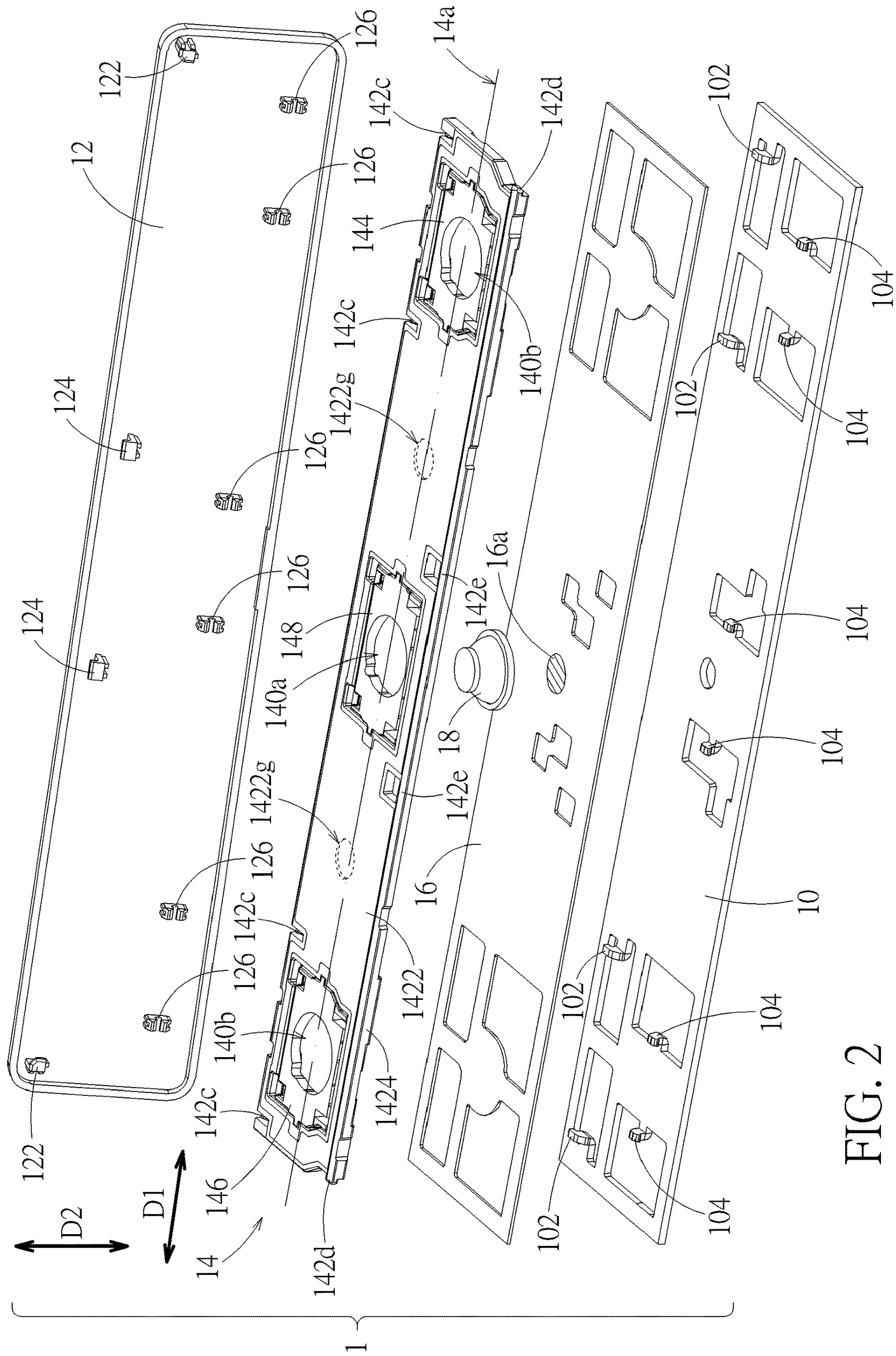
FIG. 2 is an exploded view of the keyswitch structure in FIG. 1; therein, supports of a support mechanism are arranged coplanar, which facilitate the observation of the profile of each support.
Figure 3:
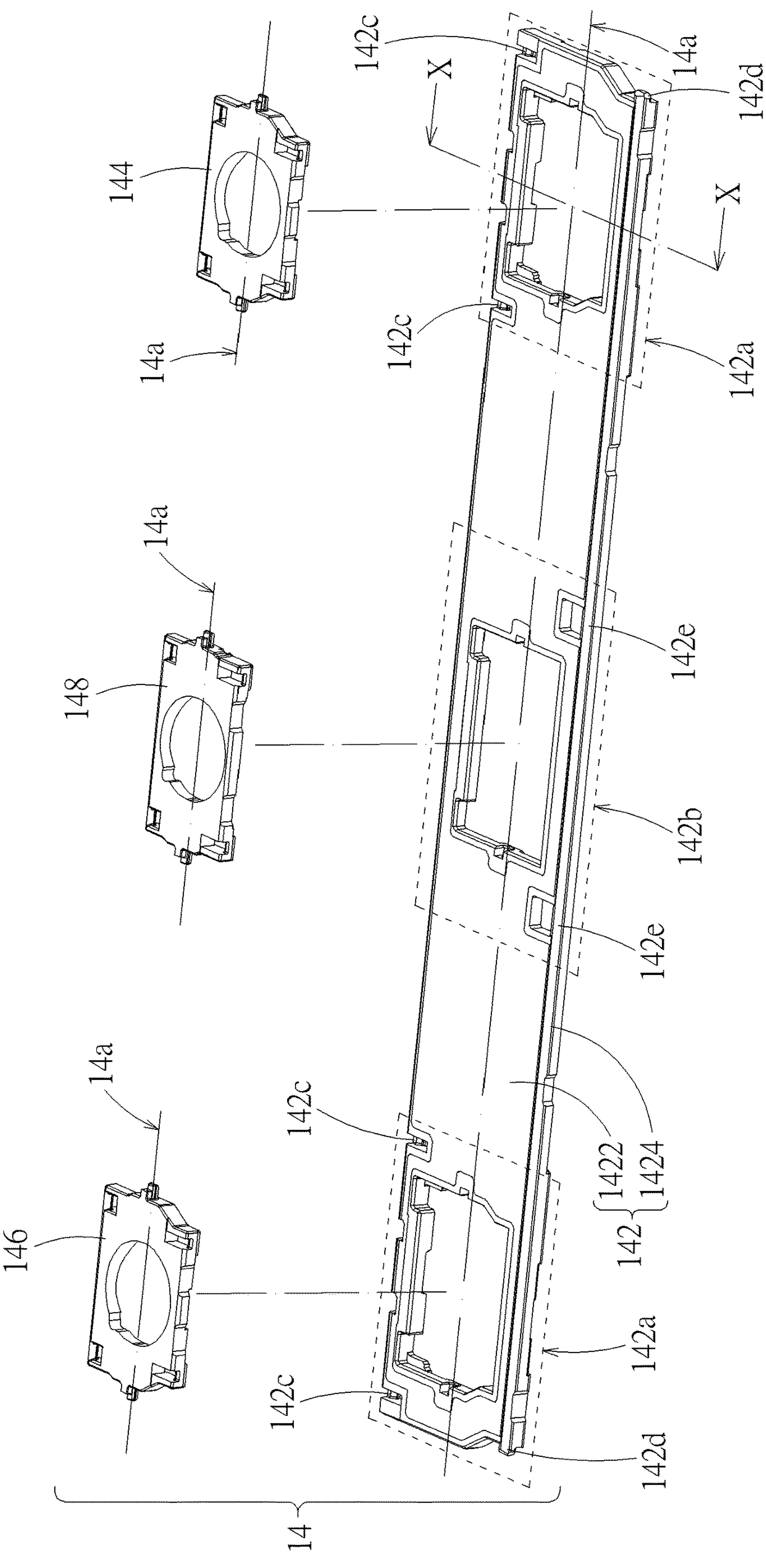
FIG. 3 is an exploded view of the support mechanism in FIG. 2.

Please refer to FIG. 1 to FIG. 3. A keyswitch structure 1 according to a first embodiment includes a base plate 10, a keycap 12, a support mechanism 14, a switch circuit board 16, and a resilient part 18. The keycap 12 extends longitudinally in a lengthwise direction D1 (i.e. the direction parallel to the long side of the keycap 12, indicated by a dual-head arrow in the figures), so that the keycap 12 is an elongated structure. In the embodiment, the keycap 12 is rectangular and has a length and a width. The ratio of the length to the width is between 4.5 and 7.5. The support mechanism 14 as a whole extends longitudinally in the lengthwise direction D1. The support mechanism 14 is connected to and between the keycap 12 and the base plate 10, to support the keycap 12 above the base plate 10 in a vertical direction D2 (indicated by a dual-head arrow in the figures). The lengthwise direction D1, the width direction (i.e. the direction parallel to the short side of the keycap 12, indicated by a dual-head arrow in the figures), and the vertical direction D2 are perpendicular to each other. The switch circuit board 16 is stacked on the base plate 10. The switch circuit board 16 has a switch 16*a* (shown by a hatched circle in FIG. 1). The switch circuit board 16 can be realized by, but not limited to, a membrane circuit board (which is a three-layer structure in practice, in which switch circuitry is formed on the upper and lower layers and the middle layer is used as an insulating layer sandwiched between the upper and lower layers). The resilient part 18 is disposed on the switch circuit board 16 corresponding to the switch 16*a* and passes through the support mechanism 14 (or an opening 140*a* thereof). The can be, but not limited to, a rubber dome. The keycap 12 can move up and down relative to the base plate 10 through the support mechanism 14. The keycap 12 can be pressed down to squeeze the resilient part 18 to trigger the switch 16*a*. The resilient force produced by the elastically deformed resilient part 18 can push the keycap 12 back to its original position. Furthermore, in practice, it is applicable to dispose resilient parts on switch circuit board 16 corresponding to openings 140*b* on both sides of the support mechanism 14. The resilient parts can also be squeezed by the keycap 12 to produce resilient force to reset the keycap 12. Furthermore, the switch circuit board 16 may also have corresponding switches for the resilient parts to trigger.

In the embodiment, the support mechanism 14 includes an outer support 142, a first inner support 144, a second inner support 146, and a middle support 148. The outer support 142 is pivotally connected to the first inner support 144, the second inner support 146, and the middle support 148 with respect to a rotation axis 14*a* (indicated by a chain line in the figures). The rotation axis 14*a* is parallel to the lengthwise direction D1. The middle support 148 is located between the first inner support 144 and the second inner support 146. The outer support 142, the first inner support 144, the second inner support 146, and the middle support 148 are individually connected to and between the keycap 12 and the base plate 10. In the embodiment, the first inner support 144 and the second inner support 146 form the openings 140*b*, respectively. The middle support 148 forms the opening 140*a*.

Figure 4:
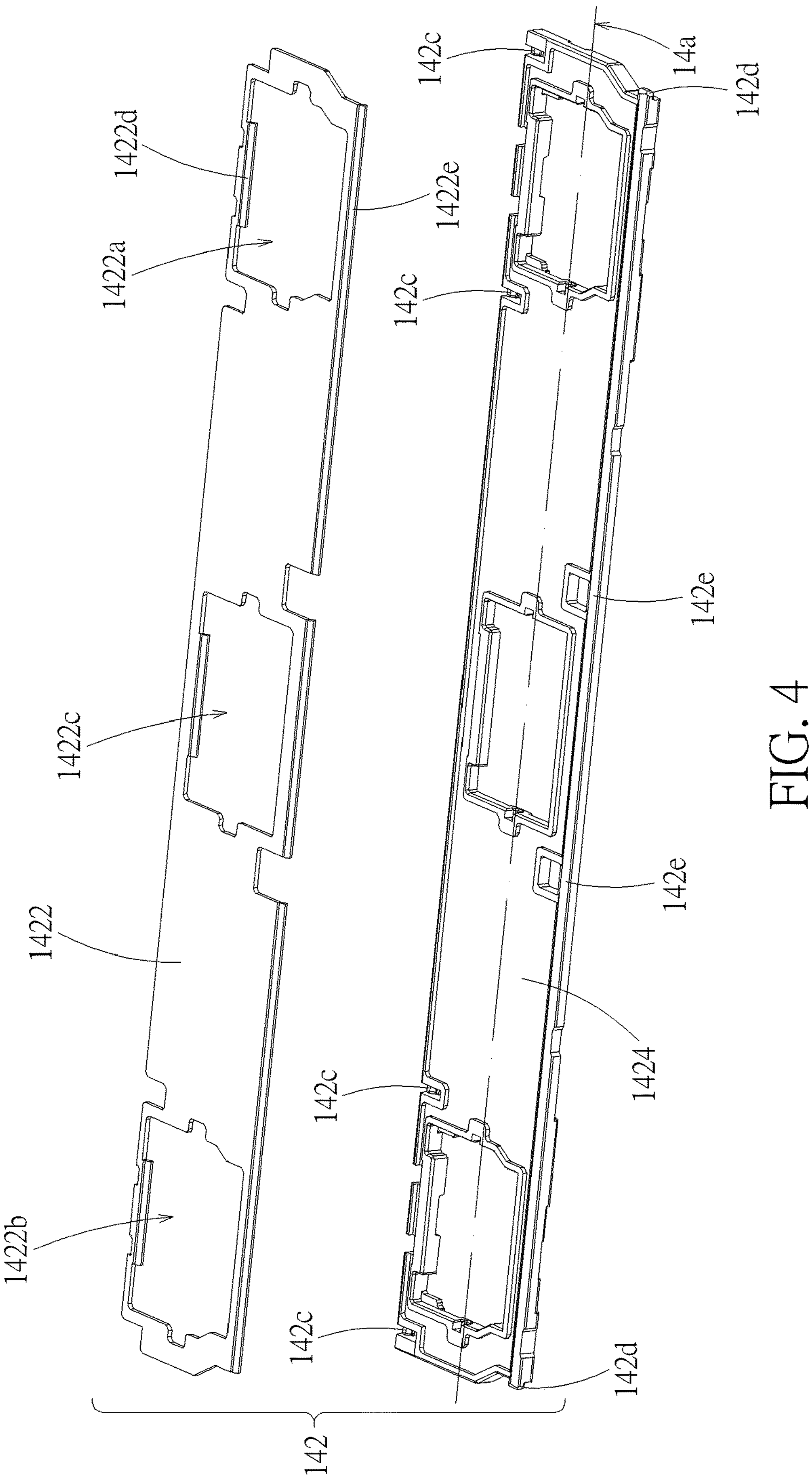
FIG. 4 is an exploded view of the outer support in FIG. 3.

Please refer to FIG. 2 to FIG. 4. The outer support 142 includes a reinforcing body 1422 and a connecting structure 1424 fixed on the reinforcing body 1422. The elastic modulus of the reinforcing body 1422 is greater than the elastic modulus of the connecting structure 1424. For example, the reinforcing body 1422 is made of metal (such as but not limited to stainless steel, copper, etc.), and the connecting structure 1424 can be made of polymer (such as but not limited to thermoplastic plastic). Therefore, the outer support 142 can improve its overall structural strength through the larger elastic modulus of the reinforcing body 1422. In practice, the combination of the reinforcing body 1422 and the connecting structure 1424 can be realized by insert molding. Furthermore, in the embodiment, the first inner support 144, the second inner support 146, and the middle support 148 have the same material as the connecting structure 1424 of the outer support 142 (so their elastic moduli are the same), but it is not limited thereto in practice.

The outer support 142 is pivotally connected to the base plate 10, the keycap 12, the first inner support 144, the second inner support, and the middle support 148 with respect to the rotation axis 14*a* through the connecting structure 1424. The reinforcing body 1422 includes a first opening 1422*a*, a second opening 1422*b*, and a middle opening 1422*c*, which are arranged along the rotation axis 14*a*. The middle opening 1422*c* is located between the first opening 1422*a* and the second opening 1422*b*. The connecting structure 1424 wraps the hole edges of the first opening 1422*a*, the second opening 1422*b*, and the middle opening 1422*c*. The first inner support 144, the second inner support 146, and the middle support 148 are located in the first opening 1422*a*, the second opening 1422*b* and the middle opening 1422*c*, respectively.

The outer support 142 defines a side connection section 142*a* (indicated by a dashed rectangle in FIG. 3) on each side in the lengthwise direction D1, and also defines a middle connection section 142*b* (indicated by a dashed rectangle in FIG. 3) between the two side connection sections 142*a* in the lengthwise direction D1. The first opening 1422*a* and the second opening 1422*b* are located in the side connection sections 142*a*, respectively. The middle opening 1422*c* is located in the middle connection section 142*b*. The outer support 142 is connected with the base plate 10 and the keycap 12 through the side connection sections 142*a* and the middle connection section 142*b*. Therein, each side connection section 142*a* includes two base plate connecting portions 142*c* and a keycap connecting portion 142*d*. The base plate connecting portions 142*c* are connected with the base plate 10 (or connecting portions 102 thereof). The keycap connecting portions 142*d* are connected with the keycap 12 (or connecting portions 122 thereof). The middle connection section 142*b* includes two keycap connecting portions 142*e*. The keycap connecting portions 142*e* are connected with the keycap 12 (or connecting portions 124 thereof). In practice, the number of the base plate connecting portions 142*c* and keycap connecting portions 142*d* and 142*e* of each connection section 142*a* and 142*b* depends on the design, but not limited to this embodiment. For example, the sum of the numbers of the base plate connecting portions 142*c* and keycap connecting portions 142*d* of the side connection section 142*a* is equal to or more than 3. For another example, the middle connection section 142*b* also includes a base plate connecting portion.

Furthermore, in the outer support 142, the reinforcing body 1422 as a whole is substantially a plate and extends along a plane (equivalent to the plane where the main body of the reinforcing body 1422 is located). The reinforcing body 1422 occupies more than 80% of the projection area of the outer support 142 (for example, projected on the plane). This structural configuration may increase the structural strength contribution of the reinforcing body 1422 to the outer support 142. On the other hand, although outer support 142 is configured to surround the first inner support 144, the second inner support 146, and the middle support 148, the outer support 142 has structural portions between the first inner support 144 and the middle support 148 and between the middle support 148 and the second inner support 146, which can also improve the structural strength of the outer support 142.

Figure 5:
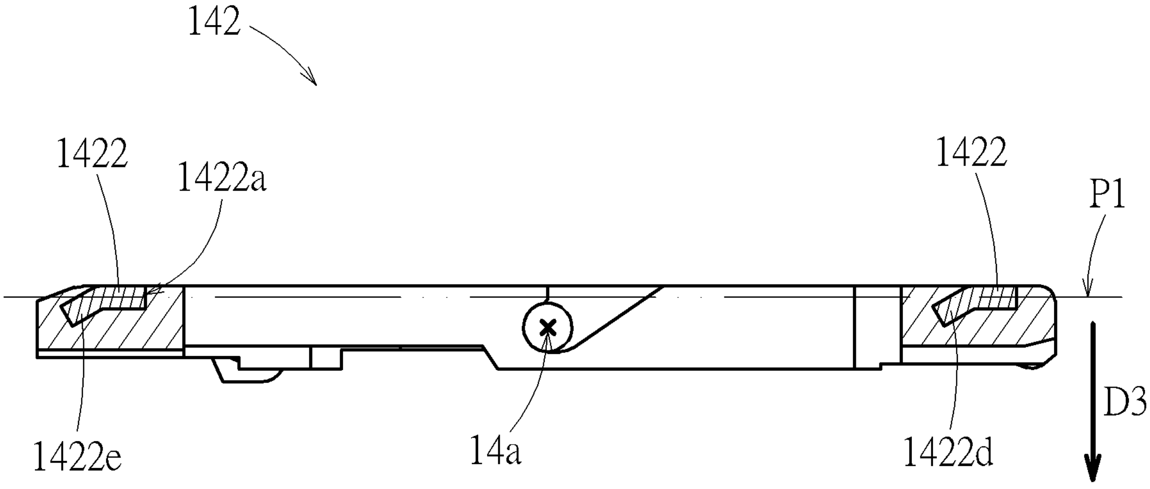
FIG. 5 is a sectional view of the outer support along the line X-X in FIG. 3.

Furthermore, please refer to FIG. 3 to FIG. 5. The reinforcing body 1422 is formed with bent fringe at its multiple structural edges, which can increase the structural strength of the reinforcing body 1422 itself and is also conducive to the combination of the reinforcing body 1422 and the connecting structure 1424. Taking the first opening 1422*a* as an example, the reinforcing body 1422 has a bent fringe 1422*d* located inside the first opening 1422*a* (i.e., at the hole edge of the first opening 1422*a*). The reinforcing body 1422 also has another bent fringe 1422*e* located outside the first opening 1422*a* (i.e., at an outer edge of the reinforcing body 1422 corresponding to the side connection section 142*a*). The fringes 1422*d* and 1422*e* bend relative to the plane P1 (i.e., the plane on which the reinforcing body 1422 extends as a whole, and which is indicated by a horizontal chain line in FIG. 5) and are inserted into the connecting structure 1424 (i.e., the connecting structure 1424 wraps the fringes 1422*d* and 1422*e*). As shown by FIG. 5, in the embodiment, the fringes 1422*d* and 1422*e* extend obliquely with respect to the reinforcing body 1422, that is, with respect to the plane P1 and the normal direction D3 (indicated by an arrow in FIG. 5) of the plane P1 (i.e., the bent fringes 1422*d* and 1422*e* are not perpendicular to the plane P1). Since the fringes 1422*d* and 1422*e* do not extend perpendicular to the plane P1, the connecting structure 1424 can provide structural restraints in multiple directions to the reinforcing body 1422 (together with the fringes 1422*d* and 1422*e*), so that in principle, unless the connecting structure 1424 is damaged in structure, the reinforcing body 1422 will not be separated from the connecting structure 1424. On the contrary, if the fringes 1422*d* and 1422*e* extend perpendicular to the plane P1, (from the view point of FIG. 5) the connecting structure 1424 lacks a structure that directly prevents the reinforcing body 1422 from being disengaged upwards.

Figure 6:
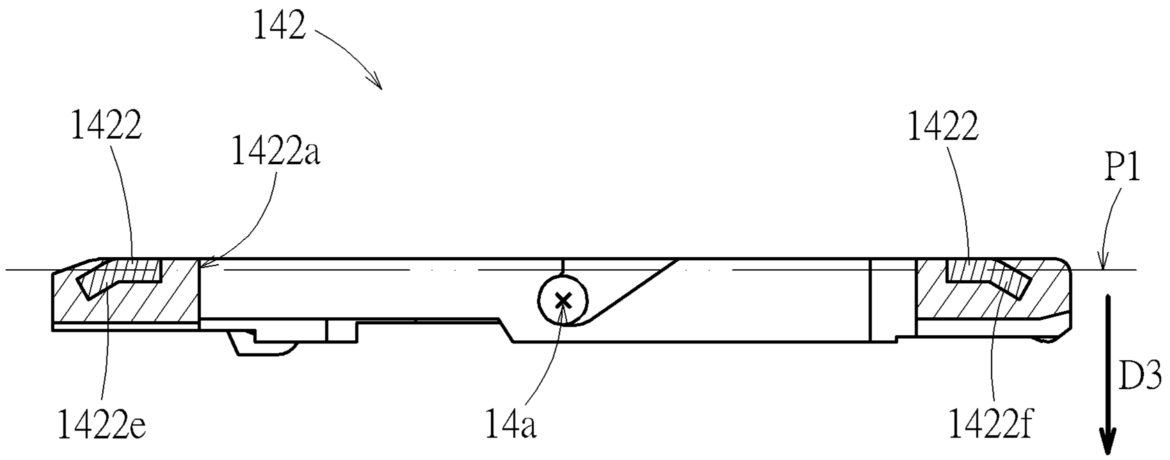
FIG. 6 is a sectional view of a variant of fringes of a reinforcing body in FIG. 5.

Furthermore, in the embodiment, the fringes 1422*d* and 1422*e* extend in the same direction; however, it is not limited thereto in practice. For example, as shown by FIG. 6, the fringe 1422*d* is changed to be disposed outside the first opening 1422*a* (i.e., on another side of the reinforcing body 1422 opposite to the fringe 1422*e*) and is shown by the fringe 1422*f*, so that the fringes 1422*f* and 1422*e* extend away from each other. This structural configuration is more helpful in preventing the reinforcing body 1422 from being separated from the connecting structure 1424. In addition, in the embodiment, in practice, the reinforcing body 1422 may additionally have at least one through hole 1422*g* (indicated by dashed circles in FIG. 3), which is fully filled with the connecting structure 1424. This structural configuration is conducive to the combination of the reinforcing body 1422 and the connecting structure 1424.

Please refer to FIG. 2 and FIG. 3. The first inner support 144, the second inner support 146, and the middle support 148 are individually connected to the base plate 10 (or connecting portions 104 thereof). The first inner support 144, the second inner support 146, and the middle support 148 are also individually connected to the keycap 12 (or connecting portions 126 thereof). In the embodiment, the base plate 10 may be a metal plate (for example, produced by metal stamping). The first inner support 144, the second inner support 146, the middle support 148, and the connecting structure 1424 of the outer support 142 may polymer parts (e.g. thermoplastic plastic parts, formed by injection molding). Therefore, the material of the first inner support 144, the second inner support 146, the middle support 148, and the connecting structure 1424 of the outer support 142 is relatively soft relative to the base plate 10 (or the connecting portions 102 of the base plate 10), and the relative sliding/rotation and friction between the above parts will not produce obvious sound in principle. Furthermore, the keycap 12 may be a polymer part (e.g. thermoplastic plastic part). Therefore, the material of the first inner support 144, the second inner support 146, the middle support 148, and the connecting structure 1424 of the outer support 142 is similar to the keycap 12, so that the relative sliding/rotation and friction between the above parts will also not produce obvious sound in principle.

Please refer to FIG. 2. In the keyswitch structure 1, the connecting portions 122 (connected to the outer support 142) and the connecting portions 124 and 126 (connected to the middle support 148 and the inner supports 144 and 146) of the keycap 12 are all arranged close to the key skirt, so in the vertical direction D2, the profile of the support mechanism 14 is only slightly smaller than the profile of the keycap 12 so that the support mechanism 14 can support the keycap 12 more stably. This structural configuration is also conducive to the support mechanism 14 transmitting the movement of the keycap 12 in the lengthwise direction D1, that is, to improve the levelness of the keycap 12 when moving up and down. Furthermore, in the embodiment, the reinforcing body 1422 as a whole is a plate, but it is not limited thereto in practice. For example, the reinforcing body 1422 is realized by at least one rod, or a combination of rods and plates, which can also achieve the effect of enhancing the structural strength of the outer support 142.

Figure 7:
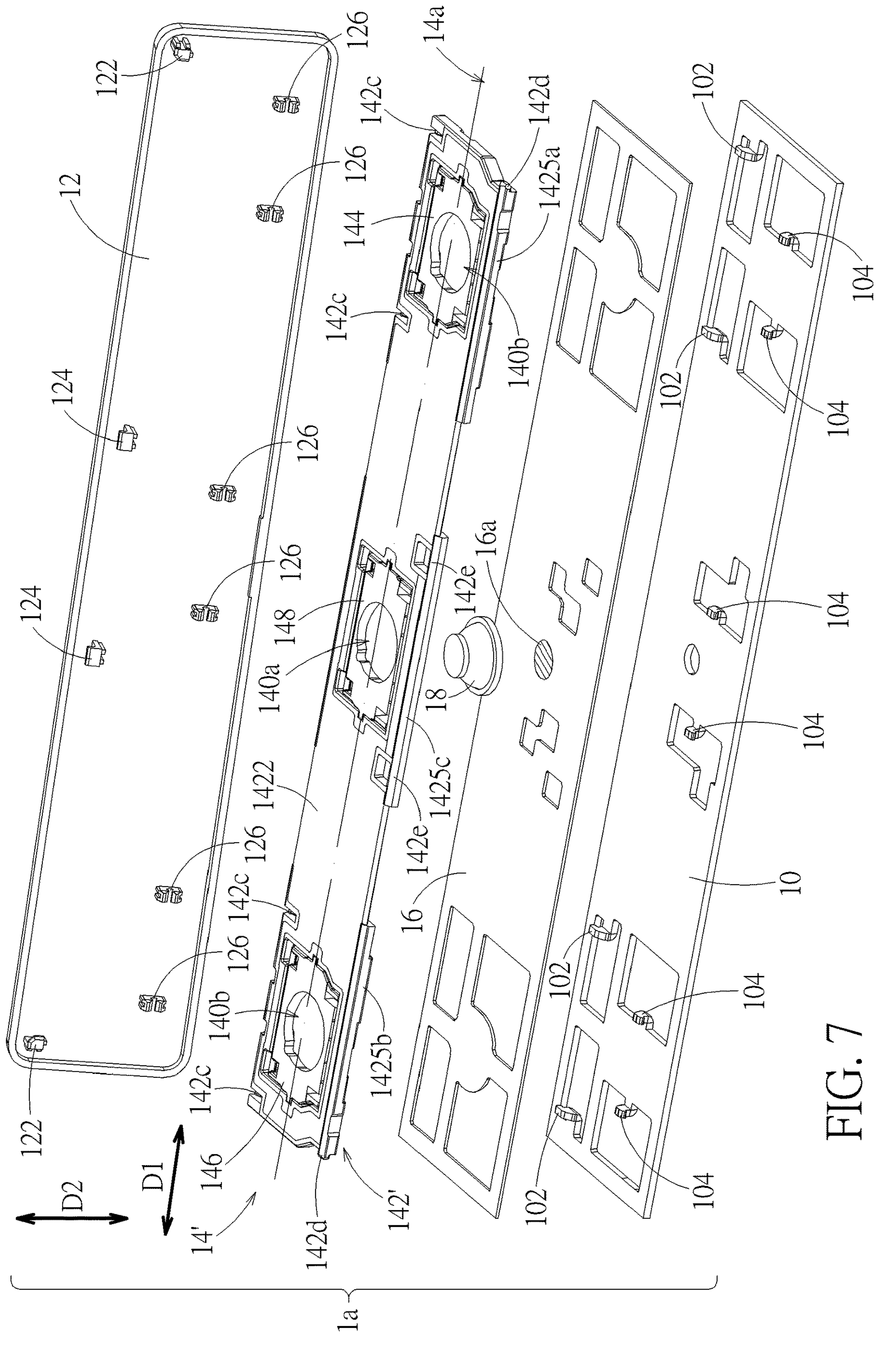
FIG. 7 is an exploded view of a keyswitch structure according to a second embodiment; therein, supports of a support mechanism are arranged coplanar, which facilitate the observation of the profile of each support.

In addition, in the embodiment, the connecting structure 1424 of the outer support 142 is a single structural part; however, it is not limited thereto in practice. For example, please refer to FIG. 7, which shows a keyswitch structure 1a according to a second embodiment. The keyswitch structure la is similar in structure to the keyswitch structure 1. The keyswitch structure 1a uses the reference numbers of the keyswitch structure 1 in principle. For other descriptions about the components of the keyswitch structure 1*a*, please refer to the descriptions of the components with the same name in the keyswitch structure 1 and variations thereof, which will not be repeated in addition. A main difference between the keyswitch structure 1*a* and the keyswitch structure 1 is that in the keyswitch structure 1*a*, the connecting structure of the outer support 142' of the support mechanism 14' is a collection of three separate structures. The connecting structure of the outer support 142' includes a first portion 1425*a*, a second portion 1425*b*, and a middle portion 1425*c*, which are arranged at intervals along the rotation axis 14*a* corresponding to the first inner support 144, the second inner support 146, and the middle support 148. In practice, the connecting structure can be further reduced in size enough to be connected with other components (such as the base plate 10, the keycap 12, the first inner support 144, the second inner support 146, and the middle support 148). In this case, the connecting structure will be a collection of a larger number of structures.

Figure 8:
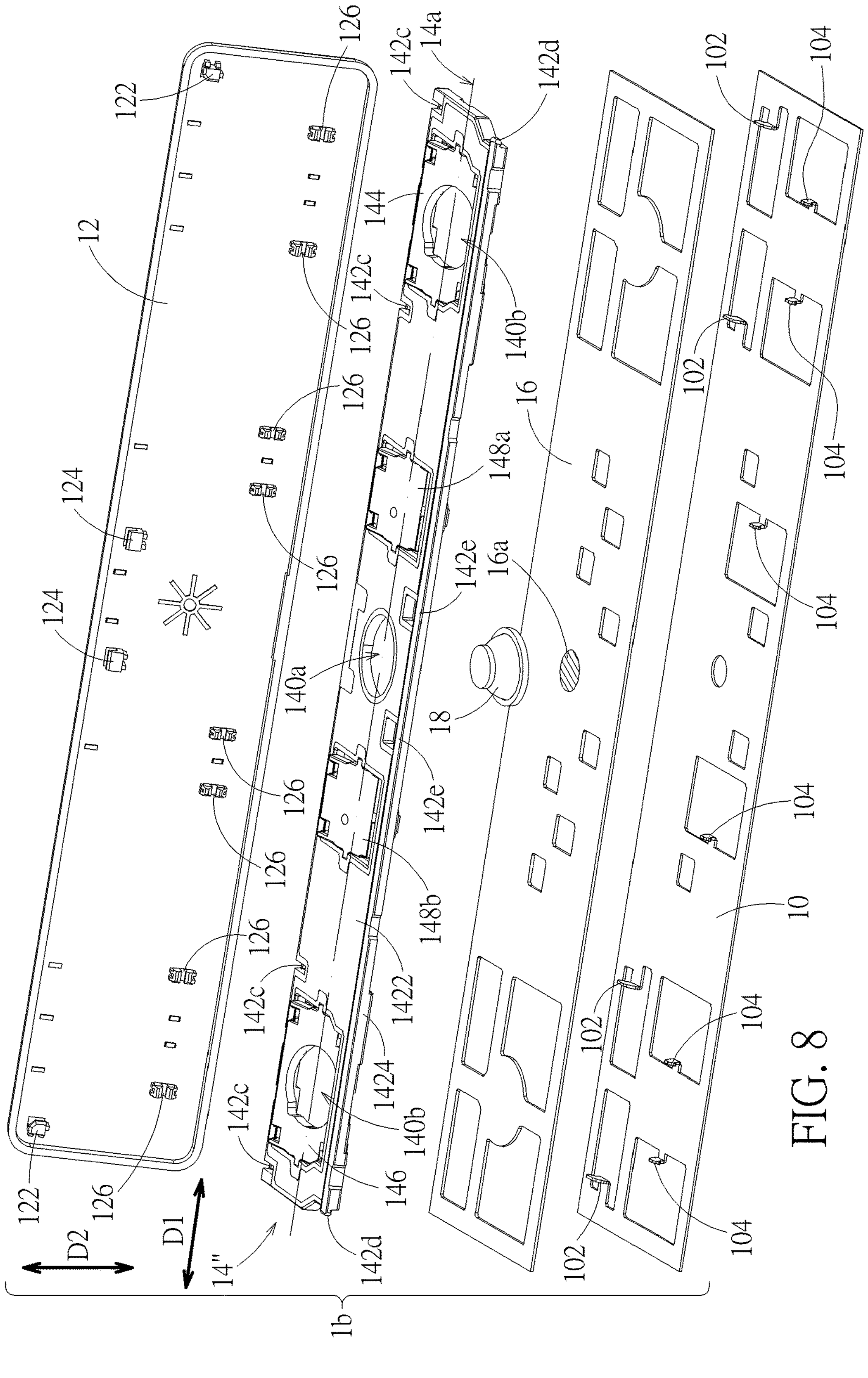
FIG. 8 is an exploded view of a keyswitch structure according to a third embodiment.
Figure 9:
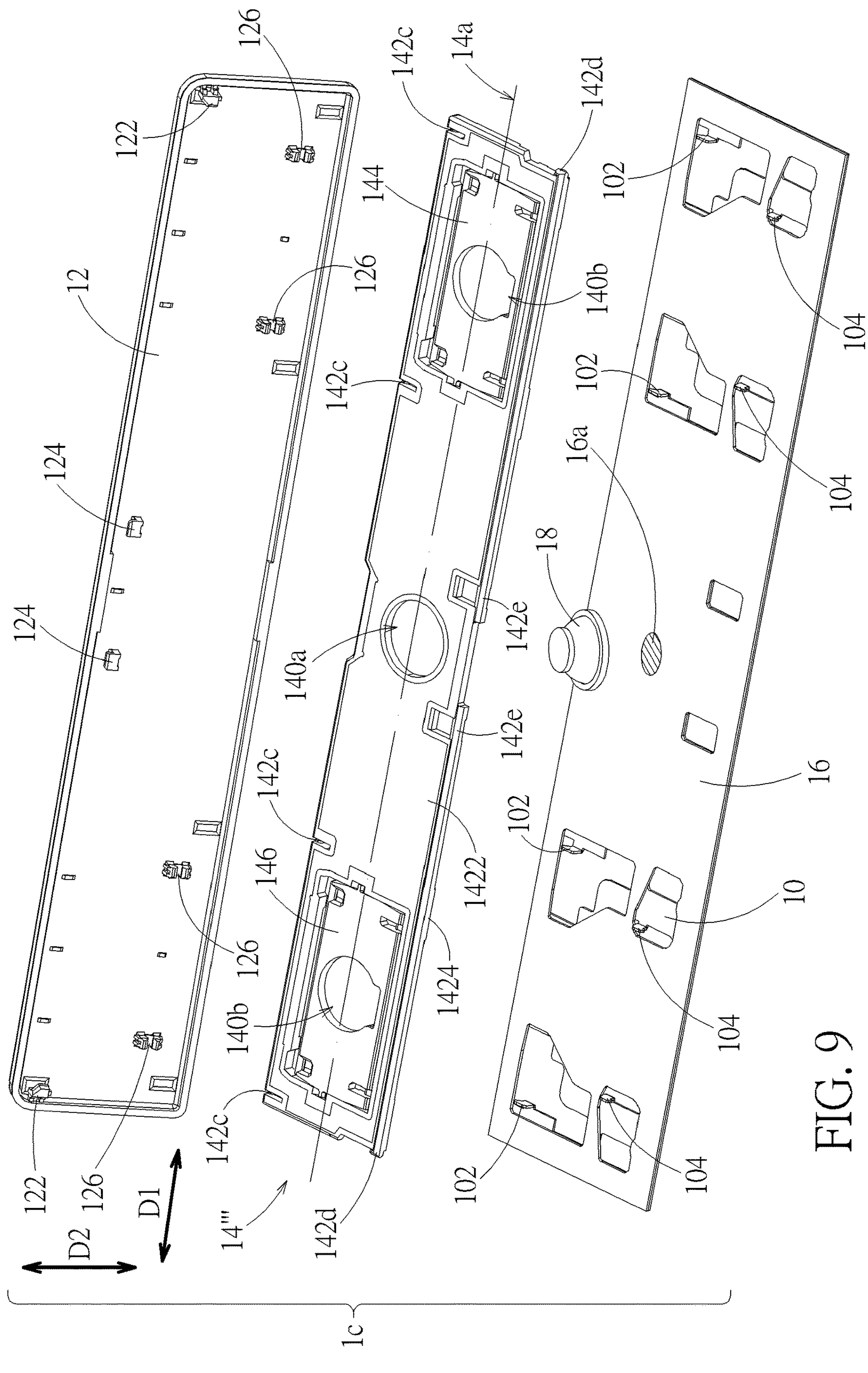
FIG. 9 is a partially-exploded view of a keyswitch structure according to a fourth embodiment; therein, supports of a support mechanism are arranged coplanar, which facilitate the observation of the profile of each support.

In addition, in the keyswitch structures 1 and 1*a*, the support mechanisms 14 and 14' have one middle support 148; however, it is not limited thereto in practice. For example, please refer to FIG. 8, which shows a keyswitch structure 1*b* according to a third embodiment. The keyswitch structure 1*b* is similar in structure to the keyswitch structure 1. The keyswitch structure 1*b* uses the reference numbers of the keyswitch structure 1 in principle. For other descriptions about the components of the keyswitch structure 1*b*, please refer to the descriptions of the components with the same name in the keyswitch structure 1 and variations thereof, which will not be repeated in addition. A main difference between the keyswitch structure 1*b* and the keyswitch structure 1 is that the support mechanism 14" of the keyswitch structure 1*b* includes two middle supports 148*a* and 148*b*. For another example, please refer to FIG. 9, which shows a keyswitch structure 1*c* according to a fourth embodiment. The keyswitch structure 1*c* is similar in structure to the keyswitch structure 1. The keyswitch structure 1*c* uses the reference numbers of the keyswitch structure 1 in principle. For other descriptions about the components of the keyswitch structure 1*c*, please refer to the descriptions of the components with the same name in the keyswitch structure 1 and variations thereof, which will not be repeated in addition. A main difference between the keyswitch structure 1*c* and the keyswitch structure 1 is that the support mechanism 14"' of the keyswitch structure 1*c* has no middle support.

As discussed above, in the keyswitch structures 1, 1*a*, 1*b* and 1*c*, the support mechanism 14 improves structural rigidity through the reinforcing body 1422, and thus the movement stability of the keyswitch structures 1, 1*a*, 1*b* and 1*c* are also be improved. The support mechanism 14 as a whole extends parallel to the lengthwise direction D1, which has a significant effect of horizontally stably supporting for long and narrow keycaps (e.g., keycap 12), so that when the corners of the keycap 12 is pressed, the support mechanism 14 still can effectively transmit the pressing force to the other end of the long side of the keycap 12 along the lengthwise direction D1 in real time, and thus the two ends of the long side of the keycap 12 can be lowered synchronously while maintaining nearly the same height. Therefore, in practice, the keycap 12 can move steadily up and down relative to the base plate 10 without the aid of a balance bar. Compared with the keyswitch structure design of the prior art in which the balance bar is added in addition to the lifting mechanism, the multi size keyswitch structures 1, 1*a*, 1*b* and 1*c* uses less number of supports, which can simplify the assembly process and enhance the production speed of the product. Furthermore, in the keyswitch structures 1, 1*a*, 1*b* and 1*c*, the structurally reinforced outer supports 142 and 142' can improve the structural rigidity without increasing the thickness, so the keyswitch structures 1, 1*a*, 1*b* and 1*c* are also suitable for low-profile designs.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A keyswitch structure, comprising:

a base plate;

a keycap; and a support mechanism, the support mechanism supporting the keycap above the base plate in a vertical direction, the support mechanism comprising:

a first inner support, the first inner support being connected to the base plate and the keycap;

a second inner support, the second inner support being connected to the base plate and the keycap; and an outer support, the outer support comprising a reinforcing body and a connecting structure fixed on the reinforcing body, an elastic modulus of the reinforcing body being greater than an elastic modulus of the connecting structure, the reinforcing body having a first opening and a second opening, the first opening and the second opening being arranged along a rotation axis, the outer support being pivotally connected to the base plate, the keycap, the first inner support, and the second inner support with respect to the rotation axis through the connecting structure, the first inner support and the second inner support being located in the first opening and the second opening, respectively.

2. The keyswitch structure according to claim 1, wherein the connecting structure comprises a first connecting portion and a second connecting portion, the first connecting portion and the second connecting portion are separate, the first inner support is pivotally connected to the outer support through the first connecting portion, and the second inner support is pivotally connected to the outer support through the second connecting portion.

3. The keyswitch structure according to claim 1, wherein the reinforcing body as a whole extends along a plane, the reinforcing body has a bent fringe, and the bent fringe is inserted into the connecting structure and is not perpendicular to the plane.

4. The keyswitch structure according to claim 3, wherein the bent fringe is located in the first opening.

5. The keyswitch structure according to claim 3, wherein the reinforcing body has another bent fringe which bends relative to the plane and is inserted into the connecting structure, and the two bent fringes extend in a same direction or away from each other.

6. The keyswitch structure according to claim 1, wherein the support mechanism comprises a middle support, the middle support is connected to and between the base plate and the keycap, the outer support and the middle support are pivotally connected with respect to the rotation axis, and the middle support is disposed between the first inner support and the second inner support.

7. The keyswitch structure according to claim 6, wherein the reinforcing body has a third opening between the first opening and the second opening, and the middle support is located in the third opening.

8. The keyswitch structure according to claim 1, wherein the outer support defines a side connection section on each side in a direction parallel to the rotation axis and defines a middle connection section between the two side connection sections, the first opening and the second opening are located on the two side connection sections, respectively, and the outer support is connected to the base plate and the keycap through the two side connection sections and is connected to the keycap through the middle connection section.

9. The keyswitch structure according to claim 1, wherein the keycap has a length and a width, and a ratio of the length to the width is between 4.5 and 7.5.

10. The keyswitch structure according to claim 1, wherein an elastic modulus of the first inner support is the same as the elastic modulus of the connecting structure.

11. The keyswitch structure according to claim 1, wherein the reinforcing body has a through hole, and the connecting structure fully fills the through hole.

12. The keyswitch structure according to claim 1, wherein the connecting structure is made of polymer, and the reinforcing body is a metal plate.

13. A keyswitch structure, comprising:

a base plate;

a keycap; and a support mechanism, the support mechanism supporting the keycap above the base plate in a vertical direction, the support mechanism comprising:

a first inner support, the first inner support being connected to the base plate and the keycap; and an outer support, the outer support comprising a reinforcing body and a connecting structure fixed on the reinforcing body, an elastic modulus of the reinforcing body being greater than an elastic modulus of the connecting structure, the reinforcing body having a first opening, the outer support being pivotally connected to the base plate, the keycap, and the first inner support with respect to a rotation axis through the connecting structure, the first inner support being located in the first opening, the reinforcing body as a whole extending along a plane, the reinforcing body having a bent fringe, the bent fringe being inserted into the connecting structure and being not perpendicular to the plane.

14. The keyswitch structure according to claim 13, wherein the bent fringe is located at the first opening.

15. The keyswitch structure according to claim 13, wherein the reinforcing body has another bent fringe, which bends relative to the plane and is inserted into the connecting structure, and the two bent fringes extend in a same direction or away from each other.

16. The keyswitch structure according to claim 13, wherein the support mechanism comprises a second inner support, the reinforcing body has a second opening, the first opening and the second opening are arranged along the rotation axis, the second inner support is pivotally connected to the outer support in the second opening with respect to the rotation axis, the support mechanism comprises a middle support, the middle support is connected to and between the base plate and the keycap, the outer support and the middle support are pivotally connected with respect to the rotation axis, and the middle support is disposed between the first inner support and the second inner support.

17. The keyswitch structure according to claim 13, wherein the support mechanism comprises a second inner support, the reinforcing body has a second opening, the first opening and the second opening are arranged along the rotation axis, the second inner support is pivotally connected to the outer support in the second opening with respect to the rotation axis, the connecting structure comprises a first connecting portion and a second connecting portion, the first connecting portion and the second connecting portion are separate, the first inner support is pivotally connected to the outer support through the first connecting portion, and the second inner support is pivotally connected to the outer support through the second connecting portion.

18. The keyswitch structure according to claim 13, wherein the keycap has a length and a width, and a ratio of the length to the width is between 4.5 and 7.5.

19. The keyswitch structure according to claim 13, wherein an elastic modulus of the first inner support is the same as the elastic modulus of the connecting structure.

20. The keyswitch structure according to claim 13, wherein the reinforcing body has a through hole, and the connecting structure fully fills the through hole.

* * * * *